Oct. 25, 1932.  F. H. RAGAN  1,884,856
BRAKE MECHANISM
Filed Nov. 10, 1928  2 Sheets-Sheet 1
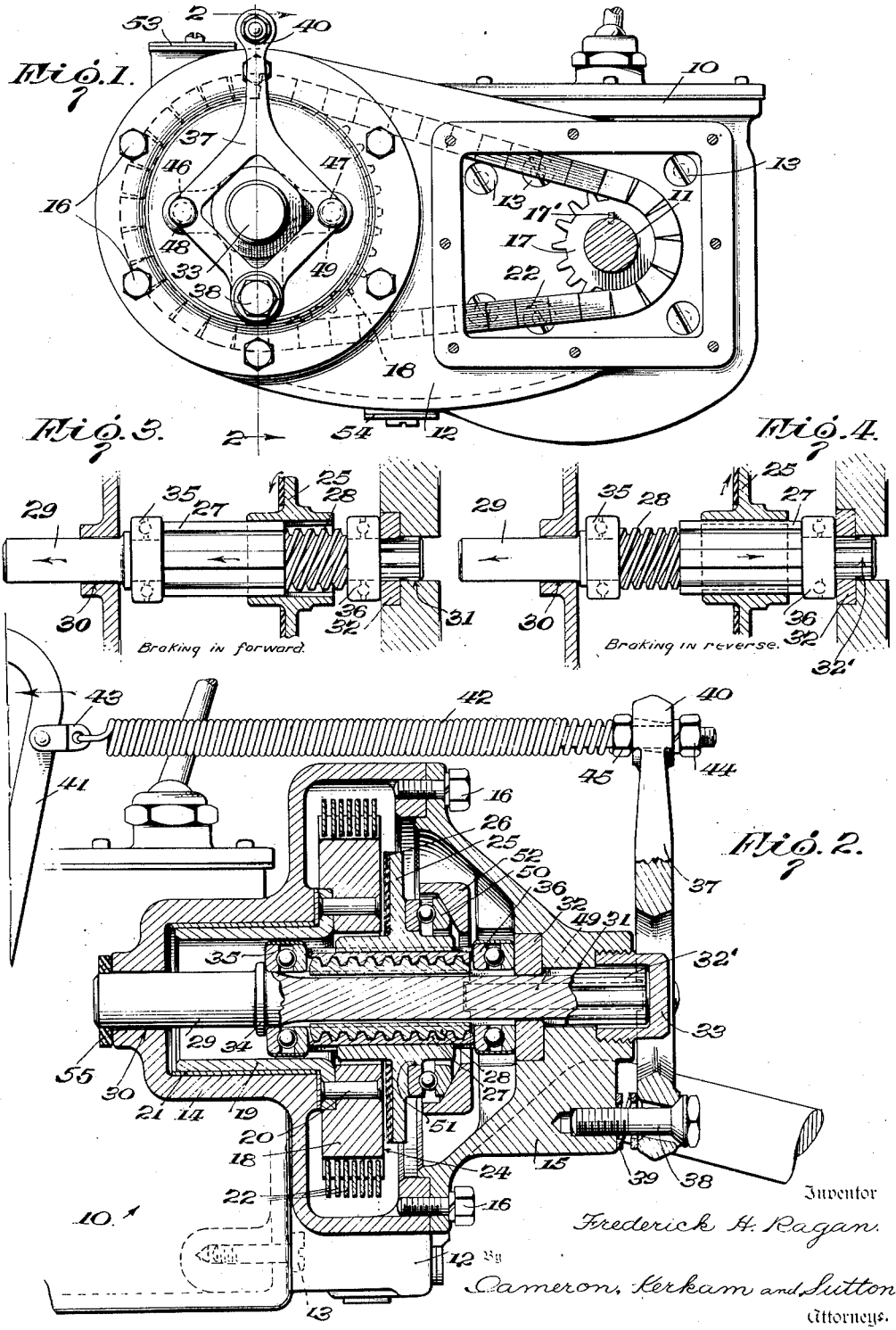

Patented Oct. 25, 1932

1,884,856

UNITED STATES PATENT OFFICE

FREDERICK HATHAWAY RAGAN, OF CLEVELAND, OHIO

BRAKE MECHANISM

Application filed November 10, 1928. Serial No. 318,544.

This invention relates to brake mechanism for automobiles, and more particularly to a power brake operating mechanism in which the brake applying force is derived from the motion of the vehicle, and in which the application of such force is at all times under complete control of the operator.

An object of the present invention is to provide such a device which is small and compact but powerful, and which is susceptible to accurate and positive control by the operator.

Another object is to provide such a device in which the forces exerted by the parts are symmetrical and balanced with respect to said parts, and in which the parts have large bearing surfaces so that lost motion will not develop during long periods of operation.

Another object is the provision of such a device the parts of which require no unusual or expensive machining operations.

Another object of the invention is the provision of such a device which may be readily applied to existing types of vehicles.

Another object is to provide such a device which will operate equally well whether the vehicle is moving forward or backward.

Other objects and advantages of the device will be in part obvious, and will become apparent to those skilled in the art through the following description taken in connection with the disclosure in the accompanying drawing which illustrates a preferred embodiment of the invention.

In the drawing—

Fig. 1 is a rear view of the brake operating mechanism in assembled relation with the motor vehicle transmission mechanism;

Fig. 2 is a longitudinal section through the device taken approximately on the line 2—2 of Fig. 1;

Fig. 3 is a detail view partly in longitudinal section, of the brake actuating elements of the device while operating to brake forward motion of the vehicle;

Fig. 4 is a similar detail showing the position of the parts while operating to brake rearward motion of the vehicle.

Figure 5:
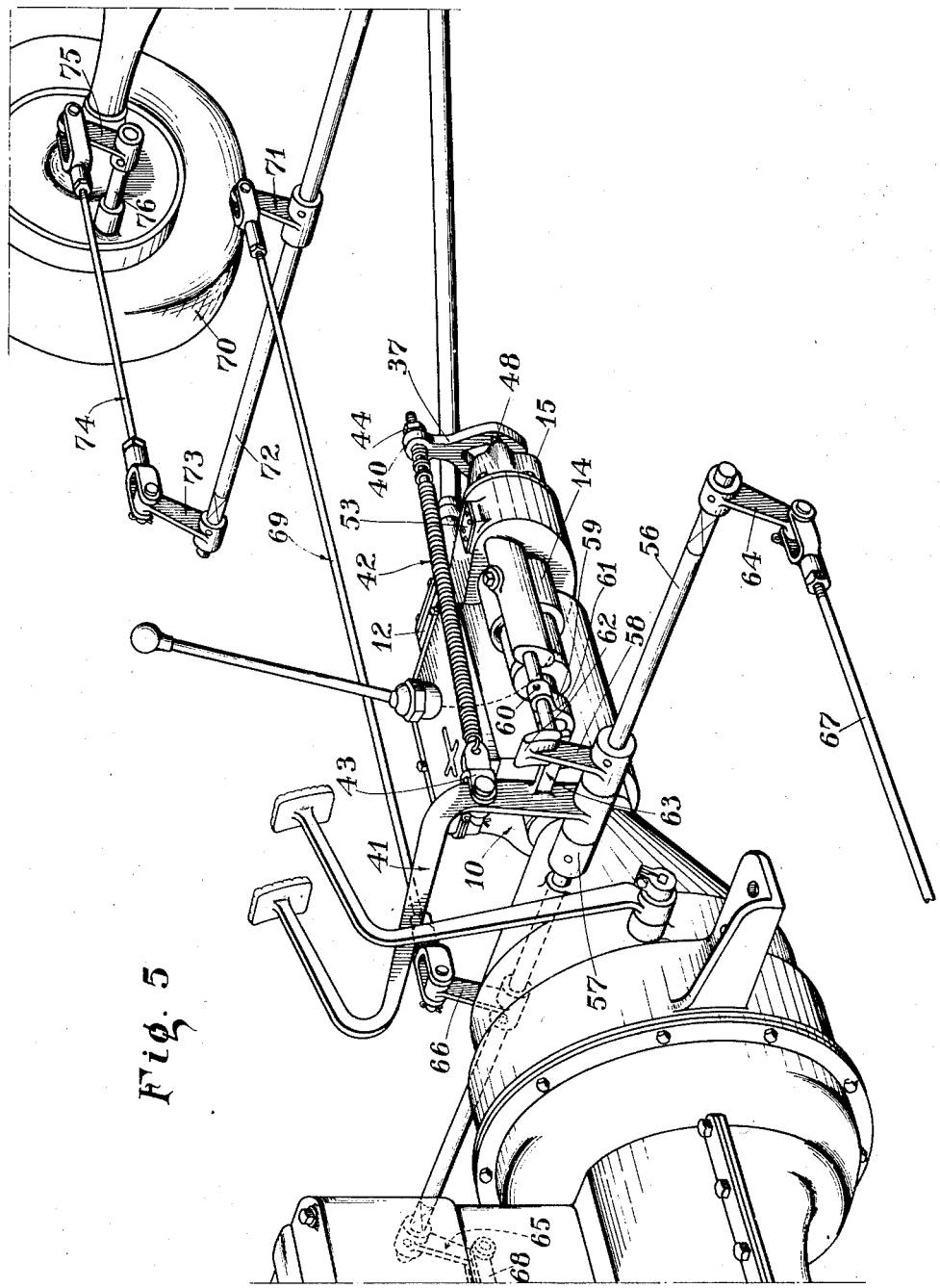
Fig. 5 is a semi-diagrammatic view of the device in operative relation with the brake applying connections.

Referring to the drawing, numeral 10 indicates a motor vehicle transmission housing of any suitable type, having a drive shaft 11 extending rearwardly therefrom. A housing 12 for the brake operating mechanism is rigidly attached to the rear end of the transmission housing 10 by any suitable means such as the screws 13, and extends laterally of the transmission housing. The housing 12 is provided with a forwardly extending portion 14, and a rearwardly extending closure member 15, fixed thereto by suitable means such as cap screws 16.

A sprocket 17 is keyed in any suitable way as indicated at 17' upon the drive shaft 11 within the housing 12. A second sprocket 18 is mounted within the laterally extending portion of said housing and suitably journaled in the portion 14 thereof as by means of a bearing sleeve 19 which is fixed thereto by suitable means such as the rivets 20, and is journaled within a bearing 21 in said portion 14. A sprocket chain 22 is adapted to connect the sprockets 17 and 18 so that the motion of drive shaft 11 is at all times imparted to the sprocket 18.

Sprocket 18 is provided with a plane surface 24 on one side, and a clutch member 25 having a friction lining 26 is slidably mounted adjacent thereto and is adapted to be moved into engagement therewith. Clutch member 25 is splined upon a driving member in the form of an internally threaded sleeve 27, which in turn is threaded upon a second driving member in the form of an externally threaded sleeve 28. Sleeve 28 is splined upon a shaft 29 which constitutes a driven member. Shaft 29 is mounted in bearings 30 and 31 in the portion 14 and closure member 15 of casing 12, respectively, so that said shaft forms the support for the driving sleeves 27 and 28, and the slidable clutch member 25. A splined insert 32 is non-rotatably mounted in the closure member 15 in any suitable manner, and cooperates with splines 32' on shaft 29 to prevent rotation of said shaft while permitting reciprocation thereof. A cap 33 threaded within the outer end of closure member 15 serves to seal the casing at this point, and may be used as a thrust bearing to limit the rearward travel of shaft 29.

Shaft 29 is provided with a shoulder 34 within the housing 12, and an anti-friction thrust bearing 35 is seated on the shaft adjacent thereto. A second anti-friction thrust bearing 36 is loosely mounted upon shaft 29 and is adapted to bear against the insert member 32 within the closure member 15. Threaded sleeves 27 and 28 are of equal length and are adapted to bear at their ends against the thrust bearings 35 and 36, the arrangement being such that when the threaded sleeves 27 and 28 are completely telescoped, shaft 29 is allowed to assume its rearmost position.

An operating lever 37 is universally pivoted to the closure member 15 in any suitable way as by means of the cap screw 38 and spacing spring 39, and is connected at its free end 40 with a brake pedal arm 41 by suitable means such as the yielding link member 42 which is secured to the pedal arm 41 as by yoke 43, and which is adjustably connected to the lever 37 by suitable means such as nut members 44 and 45. Lever 37 is provided on an intermediate portion thereof with lateral extensions 46 and 47 (Fig. 1) which are adapted to engage and operate a pair of sliding push bars 48 and 49 which are slidably mounted in openings in the closure member 15, and extend therein. An anti-friction bearing 50 is mounted upon a shoulder 51 of clutch member 25, and a thrust ring 52 is arranged to bear against the thrust bearing 50 on one side and against the inner ends of thrust bars 48 and 49 on its other side so as to transmit the thrust of said bars through the thrust bearing 50 to clutch member 25 and cause the latter to engage the surface 24 of sprocket 18.

Shaft 29 extends forwardly through the bearing 30 in portion 14 of casing 12 and is adapted to engage at its forward end with any suitable form of brake actuating mechanism and operate the same by forward motion thereof. Casing 12 may be provided with filler and drain openings having suitable closures 53 and 54, and suitable packing as indicated at 55 may be used for the shaft 29 where it protrudes from casing 12, so that a pool of lubricant may be retained in the casing.

In operation, when the vehicle is moving forward the drive shaft 11 will be rotating in a counterclockwise direction, as viewed in Fig. 1, and consequently the sprocket member 18 will also be rotating in a counterclockwise direction. If it be desired to apply the brakes, pressure is applied to the pedal arm 41 causing it to move to the left (Fig. 2), and to swing lever 37 in the same direction by means of link 42. The motion of lever 37 is imparted to the push bars 48 and 49 which bear against the thrust ring 52 and cause the clutch member 25 to engage the sprocket 18 with a pressure proportional to the pressure exerted upon the pedal arm 41. Rotation will thus be imparted from sprocket member 18 to clutch member 25 which in turn rotates the threaded sleeve 27 in the same direction as that of sprocket 18, due to the splined connection therebetween. The sleeves as illustrated are provided with left hand threads so that this rotation of sleeve 27 will cause it to move forwardly or to the left as seen in Fig. 2, upon sleeve 28, inasmuch as the latter is prevented from rotation by reason of its splined connection with the non-rotatable shaft 29. Sleeve 28 is prevented from moving rearwardly or to the right as seen in Fig. 2, by reason of its engagement with the thrust bearing 36, and sleeve 27 is therefore caused to engage thrust bearing 35 and cause forward motion of shaft 29, as illustrated in Fig. 3. It will be noted that the force exerted by shaft 29 is derived from the rotation of sprocket 18, under the control of the frictional engagement between the clutch member 25 and said sprocket, and varies in proportion to the pressure exerted on clutch member 25, its absolute value depending upon the proportions of the parts which may be designed to give any desired force multiplying factor. Forward motion of shaft 29, produced as above described, is utilized to apply the vehicle brakes by any suitable form of operating connection. One suitable form of operating connection is shown for example in Fig. 5 of the drawing wherein the pedal 41 is shown as loosely journaled on a brake operating shaft 56 journaled at its ends in suitable bearings in the frame (not shown) of the vehicle. Pedal 41 is maintained in position on shaft 56 by a collar 57 on one side and a crank 58 fixed to shaft 56 on the opposite side.

Thrust shaft 29 is arranged to cooperate with a thrust member 59 adjustably mounted as by means of a set-screw 60 on a shaft 61 slidably mounted in the casing 14. Shaft 61 is adapted to cooperate with a thrust block 62 mounted on the end of crank 58 or formed integrally therewith. Pedal 41 may also be provided with an off-set lug 63 arranged rearwardly of crank 58 and adapted to actuate the same in case the servo mechanism is inoperative for any reason.

Cross shaft 56 carries operating cranks 64 and 65 for the front wheel brakes of the vehicle and a crank 66 for the rear wheel brakes. These cranks are connected by suitable linkages 67, 68, and 69 respectively to the corresponding brake operating mechanisms. One such operating mechanism for the rear wheel 70 is illustrated and takes the form for instance of a crank 71 mounted on a cross shaft 72 suitably journaled in the frame of the vehicle and provided with a crank 73 linked by means of a rod 74 with a crank 75 on brake shaft 76. It will be understood that the operating mechanism for the other wheels will be substantially similar.

It will be understood that the thrust shaft 61 is adjusted in the member 59 so that when thrust shaft 29 is in its retracted position, shaft 61 will rest against the end of crank 58. Forward motion of shaft 29 will then cause crank 58 to swing in a direction to apply the brakes. When the pressure upon the brake pedal arm 41 is released, the engagement of clutch member 25 with sprocket 18 is relieved and the shaft 29 is returned to its original position by means of the usual brake releasing spring, the pitch of the threads of sleeves 27 and 28 being steeper than the angle of repose in order to allow this releasing action to take place freely.

When it is desired to apply the brakes while the vehicle is moving rearwardly, the device operates as above described except that since the sprocket member 18 is now rotating in a clockwise direction, as viewed in Fig. 1, the direction of the thrusts exerted by sleeves 27 and 28 are reversed, sleeve 27 now bearing against thrust bearing 36, and sleeve 28 moving thrust bearing 35 and shaft 29 forwardly, as shown in Fig. 4.

It will be noted that owing to the universal support of lever 37, the pressure of thrust bars 48 and 49 upon the thrust ring 52 is evenly balanced, causing an even and smooth application of the clutch member 25 to sprocket 18. Since all the thrust exerting elements are arranged symmetrically about the thrust shaft 29, it is evident that the forces exerted are symmetrical and balanced, and the bearing surfaces are large and not subject to rapid wear.

Although but one embodiment of the invention has been shown and described in detail, it is to be expressly understood that the illustrated embodiment is non-exclusive, and various other embodiments will now suggest themselves to those skilled in the art, while changes may be made in construction, arrangement and proportions of parts, and certain features used without other features, without departing from the spirit of the invention. Reference is therefore to be had to the claims hereto appended for a definition of the limits of the invention.

What is claimed is:

1. A brake operating mechanism including a pair of normally stationary driving members connected for relative rotary and longitudinal movement, a driven member, means under the control of the operator for moving the driven member from one or the other of the driving members by causing relative rotation between the driving members, and connections between the driven member and the brakes whereby motion of the driven member will operate the brakes.

2. A brake operating mechanism including a pair of normally stationary driving members connected for relative rotary and longitudinal movement in either direction, a driven member, means under the control of the operator for moving the driven member in one direction from one or the other of the driving members by causing relative rotation between the driving members in either direction, and connections between the driven member and the brakes whereby motion of the driven member in said one direction will operate the brakes.

3. A brake operating mechanism including a pair of driving members, a driven member, means whereby rotation of one of said driving members in either direction from a normal position causes longitudinal movement of one or the other of the driving members, means for preventing longitudinal movement of the driving members in one direction from their normal position, means for transmitting longitudinal movement of either of the driving members in the opposite direction to the driven member, and connections between the driven member and the brakes whereby motion of the driven member in said opposite direction will operate the brakes.

4. In a brake operating mechanism for vehicles and the like, a rotary power member, a reciprocatory driven member, a pair of driving members so connected that relative rotation thereof causes relative longitudinal movement therebetween, manually controlled variable torque transmitting means between the power member and one of the driving members, means preventing rotation of the other driving member, means whereby relative longitudinal movement of the driving members in either direction causes movement of the driven member in one direction, and connections between the driven member and the brakes to operate the latter.

5. In a brake operating mechanism for vehicles and the like, a variable torque power transmitting member, a reciprocating driven member adapted to actuate the brakes, a pair of driving members slidably but non-rotatably connected to the power transmitting member and driven member respectively, said driving members being so connected that relative rotation therebetween causes relative longitudinal movement thereof, and means whereby longitudinal movement of either driving member in one direction is transmitted to the driven member to actuate the brakes.

6. In a brake operating mechanism for vehicles and the like, a variable torque power transmitting member, a reciprocable driven member adapted to actuate the brakes, a pair of driving members slidably but non-rotatably connected to the power transmitting member and driven member respectively, said driving members being so connected that relative rotation therebetween in either direction causes relative longitudinal movement thereof, and means whereby relative longitudinal movement of the driving members in either direction from their normal relation causes longitudinal movement of the driven member in a direction to apply the brakes.

7. In a brake operating mechanism, a force multiplying unit including a pair of driving members having a threaded connection therebetween, a driven member, means for preventing longitudinal movement of the driving members in one direction, means whereby longitudinal motion of either of the driving members in the opposite direction actuates the driven member, means preventing rotation of one driving member, and means under the control of the operator for rotating the other driving member from a rotating part.

8. In a brake operating mechanism, a force multiplying unit including two driving members threaded one within the other, a driven member, means for preventing longitudinal movement of the driving members in one direction, means whereby longitudinal motion of either of the driving members in the opposite direction actuates the driven member, means preventing rotation of one driving member, means under the control of the operator for rotating the other driving member from a rotating part, and connections between the driven member and the brakes to operate the latter.

9. In a brake operating mechanism, a force multiplying unit including two driving members having a threaded connection therebetween, means under the control of the operator for rotating one of the driving members while the other is prevented from rotating, a fixed abutment preventing longitudinal motion of the driving members in one direction, and a driven member having an abutment thereon adapted to be moved by longitudinal motion of either of the driving members in the opposite direction.

10. In a brake operating mechanism, a force multiplying unit including a driven member having an abutment thereon, a fixed abutment, two driving members, one threaded within the other and mounted on the driven member between said abutments, means preventing rotation of one of the driving members, and means under the control of the operator for rotating the other driving member.

11. In a brake operating mechanism, a force multiplying unit including a longitudinally displaceable shaft having an abutment thereon, a fixed abutment spaced therefrom, a pair of sleeves having a threaded connection therebetween, adapted to bear against said abutments, and means causing relative rotation between the sleeves.

12. In a brake operating mechanism, a force multiplying unit including a longitudinally displaceable shaft having an abutment thereon, a fixed abutment spaced therefrom, a pair of sleeves one threaded within the other adapted to bear at their opposite ends against said abutments, means under the control of the operator for causing relative rotation between the sleeves, brake mechanism, and operating connections between said shaft and said mechanism.

13. In a brake operating mechanism, a force multiplying unit including a longitudinally displaceable shaft, a pair of sleeves having a threaded connection therebetween, means restraining longitudinal motion of the sleeves in one direction, means whereby longitudinal motion of a sleeve in the opposite direction is communicated to the shaft, and means under the control of the operator actuated from a moving part for causing relative rotation between the sleeves.

14. In a brake operating mechanism, a force multiplying unit including a longitudinally displaceable shaft, a pair of sleeves having a threaded connection therebetween mounted on said shaft, means restraining longitudinal motion of the sleeves in one direction, means whereby longitudinal motion of either sleeve in the opposite direction is communicated to the shaft, and means under the control of the operator actuated from a moving part for causing relative rotation between the sleeves.

15. In a brake operating mechanism for motor vehicles a force multiplying unit including a pair of driving members having a threaded connection therebetween, a driven member, means for preventing longitudinal movement of the driving members in one direction, means whereby longitudinal motion of the driving members in the opposite direction actuates the driven member, means for rotating one driving member from a rotating part of the vehicle and means for restricting the rotation of the other driving member.

In testimony whereof I have signed this specification.

FREDERICK HATHAWAY RAGAN.